United States Patent
Audic et al.

(10) Patent No.: US 7,553,125 B2
(45) Date of Patent: Jun. 30, 2009

(54) METHOD OF CALIBRATING THE MASS OF COMPONENTS INTENDED TO BE MOUNTED AT THE PERIPHERY OF A ROTOR

(75) Inventors: Stephane Audic, Samois (FR); Eric Jacques Lefebvre, Champigny (FR); Thierry Nitre, Yerres (FR)

(73) Assignee: Snecma, Paris (FR)

( * ) Notice: Subject to any disclaimer, the term of this patent is extended or adjusted under 35 U.S.C. 154(b) by 318 days.

(21) Appl. No.: 11/419,646

(22) Filed: May 22, 2006

(65) Prior Publication Data
US 2006/0272407 A1   Dec. 7, 2006

(30) Foreign Application Priority Data
May 23, 2005   (FR) .................................. 05 05128

(51) Int. Cl.
*F03B 11/04* (2006.01)
(52) U.S. Cl. ............................. 415/118; 416/1; 416/144
(58) Field of Classification Search ................. 415/118; 416/144, 1; 408/2; 73/66, 455, 468
See application file for complete search history.

(56) References Cited

U.S. PATENT DOCUMENTS

| | | | | |
|---|---|---|---|---|
| 2,954,711 | A * | 10/1960 | Hack ........................... 408/1 R |
| 3,499,136 | A * | 3/1970 | Nunnikhoven et al. ... 219/69.17 |
| 3,663,795 | A * | 5/1972 | Myer ..................... 219/121.68 |
| 4,545,021 | A * | 10/1985 | Suzuki et al. ................ 700/279 |
| 6,354,780 | B1 * | 3/2002 | Davis et al. .................. 414/146 |
| 6,447,250 | B1 * | 9/2002 | Corrigan et al. ......... 416/193 A |
| 6,647,784 | B2 * | 11/2003 | Kashiwai et al. .............. 73/458 |
| 7,069,654 | B2 * | 7/2006 | Robbins .................. 29/889.23 |
| 2002/0017094 | A1 | 2/2002 | Landolt et al. |

FOREIGN PATENT DOCUMENTS

| | | |
|---|---|---|
| EP | 0 426 527 A1 | 5/1991 |
| FR | 2043077 | 2/1971 |
| FR | 2 739 689 | 4/1997 |
| GB | 763596 | 12/1956 |
| JP | 58-72604 | 4/1983 |

\* cited by examiner

*Primary Examiner*—Edward Look
*Assistant Examiner*—Sean J Younger
(74) *Attorney, Agent, or Firm*—Oblon, Spivak, McClelland, Maier & Neustadt, P.C.

(57) ABSTRACT

A method of calibrating the mass of components intended to be mounted at the periphery of a rotor, the method consisting, for each of the components, in removing by machining a volume of material in a region of the component situated on one of its axes of inertia in order to bring the mass of the component to a predetermined value.

8 Claims, 3 Drawing Sheets

METHOD OF CALIBRATING THE MASS OF COMPONENTS INTENDED TO BE MOUNTED AT THE PERIPHERY OF A ROTOR

BACKGROUND OF THE INVENTION AND DESCRIPTION OF THE PRIOR ART

The present invention relates to a method of calibrating the mass of identical and interchangeable components intended to be mounted at the periphery of a rotor, in particular of a fan in a turbomachine such as a turbojet or a turboprop.

The air flow path is delimited internally at the inlet of the fan by elongate platforms which are arranged between the roots of the fan blades and fastened to the rotor of the fan.

These platforms are identical and interchangeable components which must have the same mass, with a low tolerance which may be less than a gram, for example.

The manufacture of these platforms generates a relatively wide spread in the mass, thus making it necessary to calibrate the mass to compensate for this spread.

In practice, one solution consists in weighing each platform and in adhesively bonding at least one resin weight or elastomer weight in a longitudinal cavity in the inner face of the platform so as to compensate for a deficit in mass with respect to a predetermined value.

The platforms are complex in shape and the operation of adhesively bonding the weights is carried out by hand. The addition of one or more weights modifies the position of the center of gravity of the platform, which may cause the platform to tilt during operation about the points where it is fastened to the rotor, resulting in separations of the air stream with a deterioration in the engine performance.

The use of these weights also makes it necessary to procure and store these components, and it is required to fasten them carefully using an adhesive.

SUMMARY OF THE INVENTION

The particular subject of the invention is to prevent all of these disadvantages and to provide a simple, effective and economic solution to calibrating the mass of components of this type.

To this end, it proposes a method of calibrating the mass of components intended to be mounted at the periphery of a rotor, wherein, with the positions of the axes of inertia of the components being known, it consists, for each of the components, in removing by machining a volume of material in a region of the component situated on one of its axes of inertia in order to bring the mass of the component to a predetermined value, with a predetermined tolerance.

A component of whatever shape comprises three axes of inertia which are perpendicular to one another and which pass through the center of gravity of the component. The positions of these axes of inertia are determined by calculation, for example by means of a modeling software on the basis particularly of the dimensions of the component, its shape, and the geometric distribution of its mass.

The removal of material in a region situated on one of the axes of inertia of the component makes it possible to preserve the static balancing of the component about this axis and therefore prevent it from tilting about this axis during operation.

The invention has many advantages. It avoids the use of weights, which increases the mass of the components, and therefore the mass of the turbomachine, and reduces the engine performance, this use of weights also being very expensive compared with the machining operation of the method according to the invention. It also avoids the procurement and storage of weights and adhesive.

The removal of material is preferably carried out in a region of the component situated on its longitudinal axis of inertia, the material being removed for example from a substantially radial end face of the component. The longitudinal axis of inertia of the component is the axis of inertia which extends in the largest dimension of the component.

The removal of material is preferably carried out by spot-facing, milling or drilling, and is advantageously integrated into the process of manufacturing the components.

In a preferred embodiment of the invention, the volume of material to be removed is converted into a diameter and a depth of hole to be machined in the component, this hole preferably being cylindrical with a flat bottom.

The diameter and depth values of the hole to be machined are not chosen freely by the operator; they are preferably between predetermined maximum and minimum values which take account of various factors connected with the region of the component in which the removal of material is carried out.

The method according to the invention is particularly, but not exclusively, suited for calibrating the mass of elongate platforms of complex shape intended to be arranged between the blades of a turbomachine fan so as to delimit internally the path of the air flow entering the fan. In these platforms the volume of material to be removed is machined from an end flange of each platform in a region centered on the longitudinal axis of inertia of the platform.

The invention also relates to a component intended to be mounted at the periphery of a rotor and comprising a mass-calibration hole centered on one of its axes of inertia, preferably on the longitudinal axis of inertia of the component. This component is, for example, a platform which delimits internally the path of an air flow circulating between the airfoils of the blades of a turbomachine fan.

The invention additionally relates to a turbomachine such as a turbojet or a turboprop, comprising a rotor on a periphery of which are mounted components each comprising a mass-calibration hole formed on an axis of inertia of the component, these mass-calibration holes preferably being centered on the longitudinal axes of inertia of the components.

BRIEF DESCRIPTION OF THE DRAWINGS

Other details, features and advantages of the present invention will become apparent on reading the description below, given by way of nonlimiting example, with reference to the appended drawings, in which.

DESCRIPTION OF THE PREFERRED EMBODIMENTS

Figure 1:
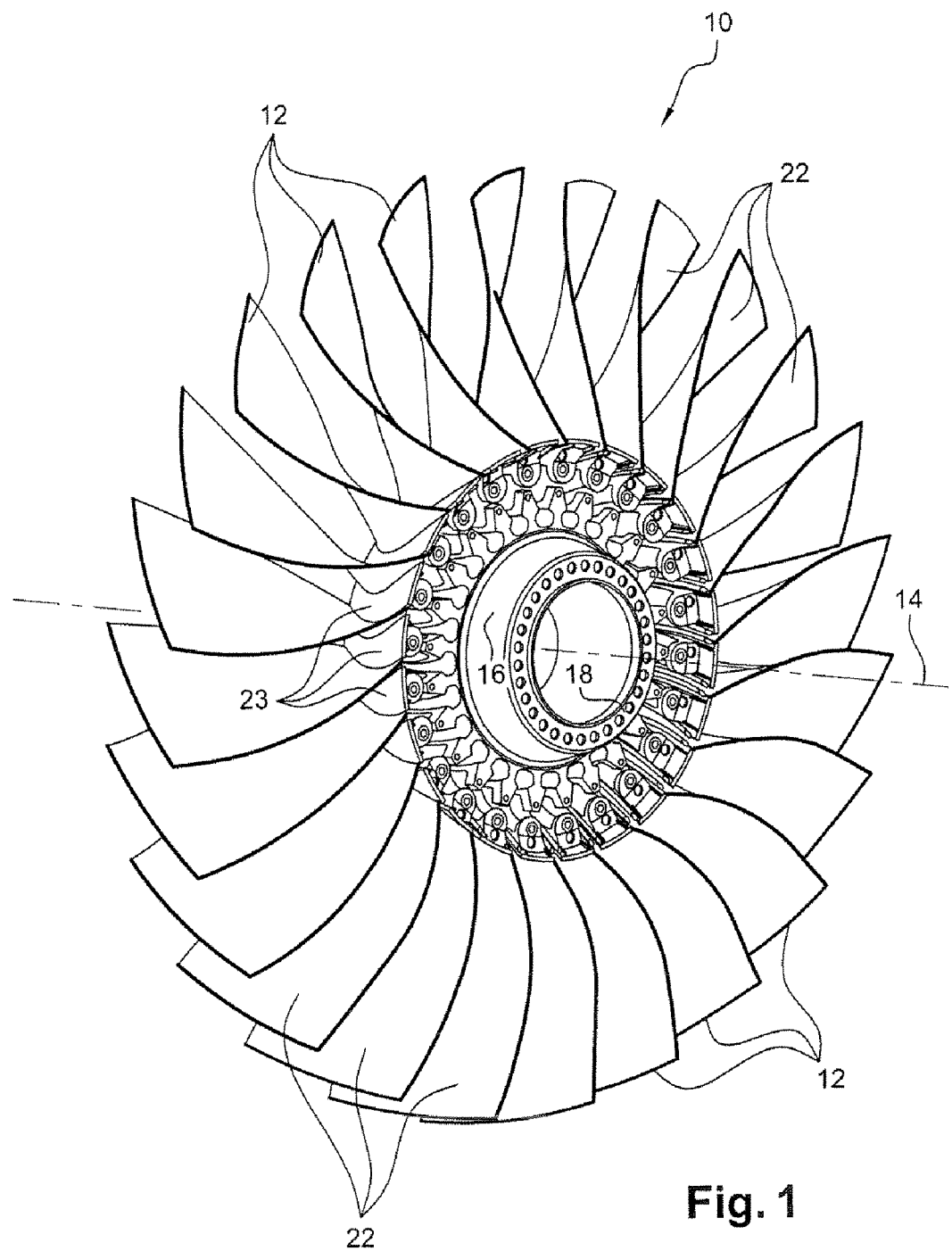
FIG. 1 is a schematic perspective view of a turbomachine fan, seen from the downstream direction.

FIG. 1 depicts a fan rotor 10 of a turbomachine such as a turbojet or a turboprop, comprising a plurality of blades 12 which extend radially around the axis 14 of the fan and are borne by a disk 16.

The disk 16 comprises a downstream annular flange 18 for fastening to a shaft of the turbomachine.

Figure 2:
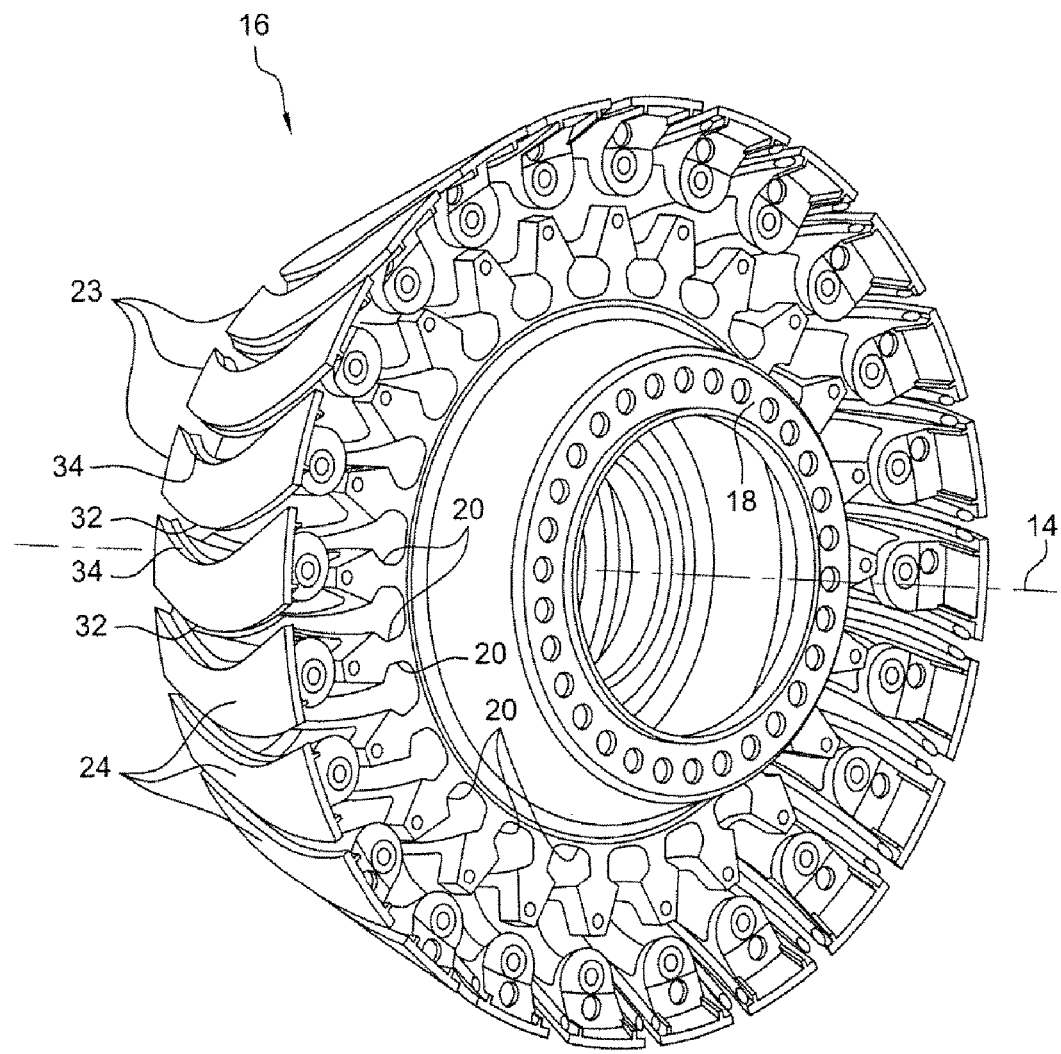
FIG. 2 is a schematic perspective view of the disk of the fan shown in FIG. 1, on an enlarged scale and seen from the downstream direction.

At their radially internal end, the blades 12 each have a root (not shown) which is fitted into a corresponding groove 20 provided in the external periphery of the disk 16 (FIG. 2).

During operation of the turbomachine, the path of the air flow circulating between the twisted airfoils 22 of the blades is delimited externally by the internal wall of a casing and internally by platforms 23 extending between the roots of the fan blades 12.

Figure 3:
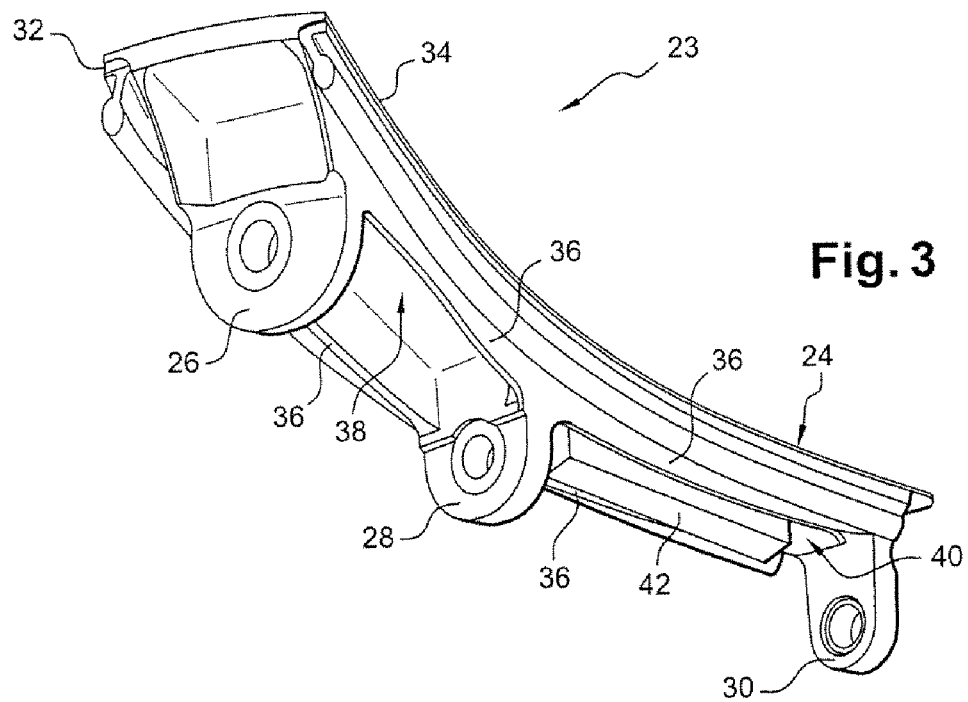
FIG. 3 is a schematic perspective view of a fan platform, the mass of which has been calibrated using a method of the prior art.

Each platform 23 comprises a wall 24 which delimits internally the path of the air flow between two adjacent blades, and fastening flanges 26, 28 and 30, numbering three in this case, which extend substantially toward the axis of rotation and which are situated in an upstream section, a downstream section and an intermediate section of the wall 24 with respect to the air flow direction (FIG. 3).

The longitudinal edges 32 and 34 of the wall 24 are curved, one being convex and the other concave, so as to follow the pressure side and suction side of the blades 12 between which the platform 23 is mounted.

The radially internal face of the wall 24 also has reinforcing ribs 36 which extend substantially inwardly from the wall 24 and which interconnect the fastening flanges 26, 28 and 30, thereby delimiting two cavities 38 and 40 below the wall 24 between the flanges 26, 28 and 30, respectively.

In the prior art described above, these cavities 38, 40 received mass-calibration weights, such as the one represented at 42 in FIG. 3, which were fastened by adhesive bonding.

Figure 4:
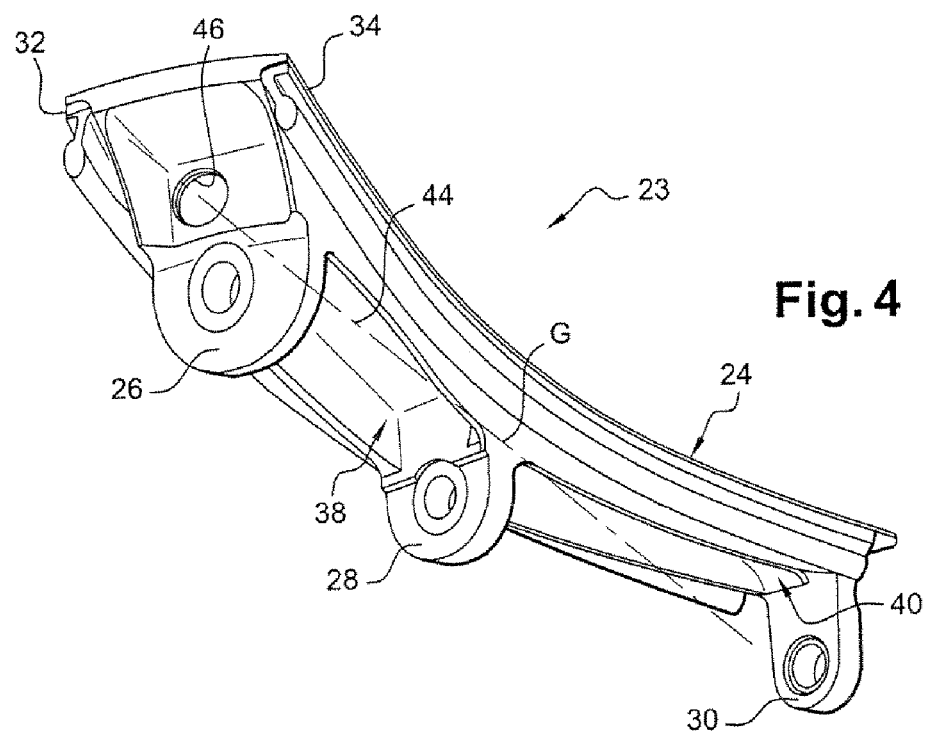
FIG. 4 is a schematic perspective view of a fan platform, the mass of which has been calibrated using the method according to the invention.

The longitudinal axis of inertia of the platform which is represented at 44 in FIG. 4 passes partly outside these cavities 38, 40, and the center of gravity G of the platform, which is situated on this axis 44, is outside the platform 23.

The weight or weights 42 adhesively bonded in the cavities 38, 40 of the platform according to the prior art indeed made it possible to calibrate the mass of the platform, but modified its static balancing and, because of the high rotational speeds and the large centrifugal forces resulting therefrom, were capable during operation of causing the platform to deform, with the platform rising outwardly on one side and modifying the conditions of air flow between the airfoils around the disk 16.

As already indicated, the invention avoids these disadvantages by replacing the weight or weights 42 of the prior art with the machining of a hole 46 in a region of the downstream flange 26 which is centered on the longitudinal axis of inertia 44 of the platform.

A preliminary step of the method according to the invention consists in weighing each platform 23 and in determining its excess of mass over a predetermined value, which is a minimum value for all of the platforms.

This difference in mass is converted into a volume of material to be removed, that is to say into a diameter and a depth of hole 46 machined on the downstream face of the flange 26 and centered on the longitudinal axis of inertia 44 of the platform.

In the example represented, and in a preferred manner, the machined hole 46 is cylindrical with a flat bottom.

The position of the longitudinal axis of inertia 44 has been determined with the aid of a suitable software on the basis of data relating to the platform 23, such as its dimensions, its mass, its shape, and the geometric distribution of its mass.

The longitudinal axis of inertia 44 passes through the central flange 28 and the downstream flange 26, and the removal of material carried out on the downstream flange shifts the center of gravity of the platform 23 along the longitudinal axis of inertia 44 of the platform without modifying the static balance of the platform around this axis.

In practice, a table of values provides direct information on the depth and the diameter of the hole 46 to be machined on the basis of the mass of material to be removed. This table is established beforehand and gives death and diameter values which are between predetermined maximum and minimum values in order not to form a hole 46 having too large a diameter and too shallow a depth, or vice versa.

The removal of material may be carried out by spotfacing, milling or drilling using a suitable tool.

The method according to the invention then makes provision to weigh the platform 23 to check that the desired tolerance with respect to the predetermined value is observed.

The removal of material can be carried out on means used for fastening the component, as in the example represented, or on any other part of the component that is centered on the longitudinal axis of inertia of the component and accessible to a machine tool.

The removal of material is generally carried out on one of the axes of inertia of the component about which it is desired to preserve the static balancing of the component during operation. If, for example, the largest dimension of the component is circumferential with respect to an axis of rotation, the removal of material will be carried out on the axis of inertia of the component which extends in this circumferential dimension.

The mass-calibration method according to the invention is applicable to any component intended to be mounted on a rotating part. It is equally applicable to components of simple shape and components of complex shape.

The invention claimed is:

1. A method of calibrating the mass of a rotor component to be mounted at the periphery of a rotor, said method comprising the steps of:
   determining a predetermined value for a calibrated mass of said rotor component;
   weighing said rotor component thereby obtaining an actual mass of said rotor component;
   determining a mass difference between said calibrated mass and said actual mass;
   determining an axis of inertia of the rotor components, said rotor component having three axes of inertia that are perpendicular to one another and that pass through the center of gravity of the rotor component removing by machining a volume of material from the rotor component, said volume of material removed corresponding to said mass difference and being centered on said axis of inertia, said step of removing being performed so as to shift the center of gravity of said rotor component along said axis of inertia without modifying a static balance of the rotor component around said axis of inertia and so as to change the actual mass of the rotor component to be equal to said calibrated mass, within a predetermined tolerance.

2. The method as claimed in claim 1, wherein said step of removing is performed such that the volume of material is centered on the longitudinal axis of inertia of the rotor component, said longitudinal axis of inertia extending in a largest dimension of the rotor component.

3. The method as claimed in claim 2, wherein said step of removing is performed such that the volume of material is from a substantially radial end face of the rotor component, wherein said radial end face is perpendicular to the longitudinal axis of inertia of the rotor component.

4. The method as claimed in claim 2, wherein the step of removing is carried out by spotfacing, milling or drilling.

5. The method as claimed in claim 2, wherein said step of removing is performed such that the volume of material removed is cylindrical and has a longitudinal axis that is collinear with said longitudinal axis of inertia of said rotor component.

6. The method as claimed in claim 5, further comprising converting said mass difference into a diameter and a depth of a hole machined in the rotor component during said step of removing.

7. The method as claimed in claim 6, wherein the diameter and the depth of the hole machined during said step of removing are each between predetermined maximum and minimum values.

8. The method as claimed in claim 2, wherein the rotor component is an elongate platform of complex shape to be arranged between blades of a turbomachine fan so as to delimit internally the path of air flow circulating between airfoils of the blades, and wherein the removing step comprises removing the volume of material from an end flange of said platform in a region centered on the longitudinal axis of inertia of the platform.

* * * * *